United States Patent
Palamara et al.

(10) Patent No.: US 7,615,172 B2
(45) Date of Patent: Nov. 10, 2009

(54) METHODS FOR PRODUCING SINTERED PARTICLES FROM A SLURRY OF AN ALUMINA-CONTAINING RAW MATERIAL

(75) Inventors: Thomas C. Palamara, Eufaula, AL (US); Brett Allen Wilson, Lafayette, LA (US)

(73) Assignee: Carbo Ceramics, Inc., Houston, TX (US)

( * ) Notice: Subject to any disclaimer, the term of this patent is extended or adjusted under 35 U.S.C. 154(b) by 450 days.

(21) Appl. No.: 11/365,230

(22) Filed: Mar. 1, 2006

(65) Prior Publication Data

US 2006/0219600 A1    Oct. 5, 2006

Related U.S. Application Data

(60) Provisional application No. 60/657,528, filed on Mar. 1, 2005.

(51) Int. Cl.
*B28B 11/06* (2006.01)
*C04B 35/10* (2006.01)
(52) U.S. Cl. .................. 264/131; 264/652; 264/669; 264/673; 264/681
(58) Field of Classification Search ................ 427/212; 264/131, 652, 669, 673, 681
See application file for complete search history.

(56) References Cited

U.S. PATENT DOCUMENTS

| | | |
|---|---|---|
| 1,942,431 A | 1/1934 | Jung |
| 2,566,117 A | 8/1951 | Christie et al. |
| 2,699,212 A | 1/1955 | Dismukes |
| 2,799,074 A | 7/1957 | Garloni |
| 2,950,247 A | 8/1960 | McGuire, Jr. et al. |
| 2,966,457 A | 12/1960 | Starmann et al. |
| 3,026,938 A | 3/1962 | Huitt et al. |
| 3,075,581 A | 1/1963 | Kern |
| 3,079,243 A | 2/1963 | Ueltz |
| 3,126,056 A | 3/1964 | Harrell |
| 3,241,613 A | 3/1966 | Kern et al. |
| 3,242,032 A | 3/1966 | Schott |
| 3,245,866 A | 4/1966 | Schott |
| 3,347,798 A | 10/1967 | Baer et al. |
| 3,350,482 A | 10/1967 | Bowers |

(Continued)

FOREIGN PATENT DOCUMENTS

AR    241543    8/1992

(Continued)

OTHER PUBLICATIONS

Office Action issued by the U.S. Patent and Trademark Office on Mar. 19, 2004, in connection with U.S. Appl. No. 10/268,169.

(Continued)

*Primary Examiner*—H. (Holly) T Le
(74) *Attorney, Agent, or Firm*—Haynes and Boone, LLP

(57) ABSTRACT

Methods for producing substantially round, spherical and sintered particles from a slurry of a calcined, uncalcined or partially calcined raw material having an alumina content of more than 55% by weight, and a mullite growth promoter in an amount of from about 2 to about 10% dry weight of the total solids in the slurry. Methods for using such substantially round, spherical and sintered particles in hydraulic fracturing operations.

12 Claims, 1 Drawing Sheet

U.S. PATENT DOCUMENTS

| | | | |
|---|---|---|---|
| 3,399,727 | A | 9/1968 | Graham et al. |
| 3,437,148 | A | 4/1969 | Colpoys, Jr. |
| 3,486,706 | A | 12/1969 | Weyand |
| 3,491,492 | A | 1/1970 | Ueltz |
| 3,497,008 | A | 2/1970 | Graham et al. |
| 3,598,373 | A | 8/1971 | Inman |
| 3,690,622 | A | 9/1972 | Brunner et al. |
| 3,758,318 | A | 9/1973 | Farris et al. |
| 3,810,768 | A | 5/1974 | Parsons et al. |
| 3,856,441 | A | 12/1974 | Suzukawa et al. |
| 3,890,072 | A | 6/1975 | Barks |
| 3,976,138 | A | 8/1976 | Colpoys, Jr. et al. |
| 4,051,603 | A | 10/1977 | Kern, Jr. |
| 4,052,794 | A | 10/1977 | Ganiaris |
| 4,053,375 | A | 10/1977 | Roberts et al. |
| 4,068,718 | A | 1/1978 | Cooke, Jr. et al. |
| 4,072,193 | A | 2/1978 | Sarda et al. |
| 4,077,908 | A | 3/1978 | Stenzel et al. |
| 4,104,342 | A | 8/1978 | Wessel et al. |
| 4,140,773 | A | 2/1979 | Stowell et al. |
| 4,195,010 | A | 3/1980 | Russell et al. |
| 4,268,311 | A | 5/1981 | VerDow |
| 4,296,051 | A | 10/1981 | Shimamura et al. |
| 4,303,204 | A | 12/1981 | Weston |
| 4,343,751 | A | 8/1982 | Kumar |
| 4,371,481 | A | 2/1983 | Pollock |
| 4,396,595 | A | 8/1983 | Heytmeijer et al. |
| 4,407,967 | A | 10/1983 | Luks |
| 4,427,068 | A | 1/1984 | Fitzgibbon |
| 4,439,489 | A | 3/1984 | Johnson et al. |
| 4,440,866 | A | 4/1984 | Lunghofer et al. |
| 4,442,897 | A | 4/1984 | Crowell |
| 4,450,184 | A | 5/1984 | Longo et al. |
| 4,462,466 | A | 7/1984 | Kacknik |
| 4,493,875 | A | 1/1985 | Beck et al. |
| 4,521,475 | A | 6/1985 | Riccio et al. |
| 4,522,731 | A | 6/1985 | Lunghofer |
| 4,547,468 | A | 10/1985 | Jones et al. |
| 4,555,493 | A | 11/1985 | Watson et al. |
| 4,618,504 | A | 10/1986 | Bosna et al. |
| 4,623,630 | A | 11/1986 | Fitzgibbon |
| 4,632,876 | A | 12/1986 | Laird et al. |
| 4,639,427 | A | 1/1987 | Khaund |
| 4,652,411 | A | 3/1987 | Swarr et al. |
| 4,654,266 | A | 3/1987 | Kachnik |
| 4,658,899 | A | 4/1987 | Fitzgibbon |
| 4,668,645 | A | 5/1987 | Khaund |
| 4,680,230 | A | 7/1987 | Gibb et al. |
| 4,713,203 | A | 12/1987 | Andrews |
| 4,714,623 | A | 12/1987 | Riccio et al. |
| 4,732,920 | A | 3/1988 | Graham et al. |
| 4,744,831 | A | 5/1988 | Beck |
| 4,840,729 | A | 6/1989 | Levine |
| 4,879,181 | A | 11/1989 | Fitzgibbon |
| 4,894,285 | A | 1/1990 | Fitzgibbon |
| 4,911,987 | A | 3/1990 | Sakata et al. |
| 4,921,820 | A | 5/1990 | Rumpf et al. |
| 4,921,821 | A | 5/1990 | Rumpf et al. |
| 4,993,491 | A | 2/1991 | Palmer et al. |
| 5,030,603 | A | 7/1991 | Rumpf et al. |
| 5,120,455 | A | 6/1992 | Lunghofer |
| 5,175,133 | A | 12/1992 | Smith et al. |
| 5,188,175 | A | 2/1993 | Sweet |
| 5,266,243 | A | 11/1993 | Kneller et al. |
| 5,422,183 | A | 6/1995 | Sinclair et al. |
| 5,443,633 | A | 8/1995 | Hirsbrunner et al. |
| 5,597,784 | A | 1/1997 | Sinclair et al. |
| 5,649,596 | A | 7/1997 | Jones et al. |
| 5,654,246 | A | 8/1997 | Newkirk et al. |
| 5,964,291 | A | 10/1999 | Bourne et al. |
| 5,972,835 | A | 10/1999 | Gupta |
| 5,993,988 | A | 11/1999 | Ohara et al. |
| 6,059,034 | A | 5/2000 | Rickards et al. |
| 6,074,754 | A | 6/2000 | Jacobsen et al. |
| 6,080,232 | A | 6/2000 | Sperlich et al. |
| 6,217,646 | B1 | 4/2001 | Gervais |
| 6,330,916 | B1 | 12/2001 | Rickards et al. |
| 6,364,018 | B1 | 4/2002 | Brannon et al. |
| 6,372,678 | B1 | 4/2002 | Youngman et al. |
| 6,503,676 | B2 | 1/2003 | Yamashita et al. |
| 6,528,157 | B1 | 3/2003 | Hussain et al. |
| 6,582,819 | B2 | 6/2003 | McDaniel et al. |
| 6,632,527 | B1 | 10/2003 | McDaniel et al. |
| 6,725,930 | B2 | 4/2004 | Boney et al. |
| 6,743,269 | B2 | 6/2004 | Meyer et al. |
| 6,749,025 | B1 | 6/2004 | Brannon et al. |
| 6,753,299 | B2 | 6/2004 | Lunghofer et al. |
| 6,766,817 | B2 | 7/2004 | da Silva |
| 6,772,838 | B2 | 8/2004 | Dawson et al. |
| 6,780,804 | B2 | 8/2004 | Webber et al. |
| 6,918,404 | B2 | 7/2005 | Dias da Silva |
| 7,021,379 | B2 | 4/2006 | Nguyen |
| 7,036,591 | B2 | 5/2006 | Cannan et al. |
| 7,041,250 | B2 | 5/2006 | Sherman et al. |
| 7,066,586 | B2 | 6/2006 | da Silva |
| 7,135,231 | B1 | 11/2006 | Sinclair et al. |
| 7,244,398 | B2 | 7/2007 | Kotary et al. |
| 7,270,879 | B2 | 9/2007 | McCrary |
| 7,285,255 | B2 | 10/2007 | Kadlec et al. |
| 7,387,752 | B2 * | 6/2008 | Canova et al. ............. 264/12 |
| 2004/0023818 | A1 | 2/2004 | Nguyen et al. |
| 2004/0040708 | A1 | 3/2004 | Stephenson et al. |
| 2004/0200617 | A1 | 10/2004 | Stephenson et al. |
| 2005/0028976 | A1 | 2/2005 | Nguyen |
| 2005/0028979 | A1 | 2/2005 | Brannon et al. |
| 2005/0244641 | A1 | 11/2005 | Vincent |
| 2006/0006589 | A1 | 1/2006 | Canova et al. |
| 2006/0078682 | A1 | 4/2006 | McDaniel et al. |
| 2006/0081371 | A1 | 4/2006 | Duenckel et al. |
| 2006/0135809 | A1 | 6/2006 | Kimmich et al. |
| 2006/0147369 | A1 | 7/2006 | Bi et al. |
| 2006/0162929 | A1 | 7/2006 | Urbanek |
| 2006/0175059 | A1 | 8/2006 | Sinclair et al. |
| 2007/0023187 | A1 | 2/2007 | Canova et al. |
| 2007/0212281 | A1 | 9/2007 | Kadlec et al. |
| 2008/0015103 | A1 | 1/2008 | Luscher et al. |
| 2008/0015531 | A1 | 1/2008 | Hird et al. |
| 2008/0058228 | A1 | 3/2008 | Wilson |
| 2008/0135246 | A1 | 6/2008 | Canova et al. |
| 2008/0220996 | A1 | 9/2008 | Duenckel et al. |
| 2008/0241540 | A1 | 10/2008 | Canova et al. |
| 2009/0008093 | A1 | 1/2009 | Duenckel |

FOREIGN PATENT DOCUMENTS

| | | |
|---|---|---|
| AR | 243222 | 7/1993 |
| AU | 551409 | 1/1983 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |
| CH | 647689 | 2/1985 |
| DE | 2948584 | 6/1980 |
| DK | 168099 | 7/1983 |
| EA | 006953 | 6/2006 |
| EA | 007864 | 2/2007 |
| EA | 008825 | 8/2007 |
| EA | 010944 | 12/2008 |
| EP | 0083974 | 7/1983 |
| EP | 0087852 | 9/1983 |
| EP | 0101855 | 3/1984 |

| | | |
|---|---|---|
| EP | 0116369 | 8/1984 |
| EP | 0169412 | 1/1986 |
| FR | 2486930 | 1/1982 |
| GB | 578424 | 7/1946 |
| GB | 715354 | 9/1954 |
| GB | 715882 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| MX | 161299 | 9/1990 |
| PH | 18450 | 7/1985 |
| RU | 2014281 | 6/1994 |
| RU | 2079471 | 5/1997 |
| RU | 2083528 | 7/1997 |
| RU | 2090537 | 9/1997 |
| RU | 2098387 | 12/1997 |
| RU | 2098618 | 12/1997 |
| RU | 2099661 | 12/1997 |
| RU | 2107674 | 3/1998 |
| RU | 2112189 | 5/1998 |
| RU | 2112761 | 6/1998 |
| RU | 2121988 | 11/1998 |
| RU | 2129985 | 5/1999 |
| RU | 2129987 | 5/1999 |
| RU | 2133716 | 7/1999 |
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| RU | 2229456 | 5/2004 |
| RU | 2229458 | 5/2004 |
| VE | 48083 | 7/1990 |
| VE | 49128 | 2/1993 |
| WO | WO 2005/100007 | 10/2005 |
| WO | WO 2006/010036 | 1/2006 |
| WO | WO 2006/032008 | 3/2006 |
| WO | WO 2006/094074 | 9/2006 |
| WO | WO 2007/016268 | 2/2007 |
| WO | WO 2008/008828 | 1/2008 |
| WO | WO 2008/028074 | 3/2008 |
| WO | WO 2009/009370 | 1/2009 |

OTHER PUBLICATIONS

Office Action issued by the U.S. Patent and Trademark Office on Mar. 1, 2006, in connection with U.S. Appl. No. 11/103,777.

International Search Report issued by the ISA/US on Mar. 14, 2006 in connection with International Application No. PCT/US05/12256.

Written Opinion of the International Searching Authority issued by the ISA/US on Mar. 14, 2006 in connection with International Application No. PCT/US05/12256.

Determine Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.

Lightweight Proppants for Deep Gas Well Stimulation, A. H. Jones et al, Terra Tek, Inc., Jun. 1980, TR Report 80-47.

Oxide Ceramic Proppants for Treatment of Deep Well Fractures, SPE 6816, by E.A. Neel, J.L. Parmley, and P.J. Colpoys, Jr. (1977).

Chemical Abstracts, vol. 85, No. 24, Dec. 13, 1976.

Hydraulic Fracturing with a High-Strength Proppant, Claude E. Cooke, Society of Petroleum Engineers of AIME, SPE 6213, 1976.

The Effect of Various Proppants and Proppant Mixtures on Fracture Permeability, Robert R. McDaniel, et al., SPE 7573, 1978.

DOE Progress Review No. 21 for reporting period Oct. 1-Dec. 31, 1979, Determining Feasibility of Fabricating Light Weight Proppants for Application in Gas and Oil Well Stimulation.

DOE Progress Review No. 22 for reporting period Jan. 1-Mar. 31, 1980, Determining Feasibility of Fabricating Light Weight Proppants for Application in Gas and Oil Well Stimulation.

DOE Progress Review No. 23 for reporting period Apr. 1-Jun. 30, 1980, Determining Feasibility of Fabricating Light Weight Proppants for Application in Gas and Oil Well Stimulation.

DOE Progress Review No. 24 for reporting period Jul. 1-Sep. 31, 1980, Determining Feasibility of Fabricating Light Weight Proppants for Application in Gas and Oil Well Stimulation.

DOE Progress Review No. 26 for reporting period Jan. 1-Mar. 31, 1981, Determine Feasibility of Fabricated Light Weight Proppants for Application in Gas and Oil Well Stimulation.

DOE Progress Review No. 27 for reporting period Apr. 1-Jun. 30, 1981, Determining Feasibility of Fabricating Light Weight Proppants for Application in Gas and Oil Well Stimulation.

Determine Feasibility of Fabricating Light Weight Proppants for Application in Gas and Oil Well Stimulation, Progress Report 2, DOE Contract DE-AC19-79BC10038, Submitted by Terra Tek, Inc., TR 79-77, Oct. 1979.

Lightweight Proppants for Deep Gas Well Stimulation, $2^{nd}$ Annual Report, Jul. 1, 1980-Jun. 30, 1981, published Apr. 1982, DOE Contract AC19-79BC10038, by R.A. Cutler et al, Terra Tek, Inc.; TR Report 81-108.

New Proppants for Deep Gas Well Stimulation, SPE 9869, by Raymond A. Cutler, et al., 1977.

Effect of Grinding and Firing Treatment on the Crystalline and Glass Content and the Physical Properties of Whiteware Bodies, S. C. Sane, et al., 1951.

Nepheline Syenite-Talc Mixtures as a Flux in Low-Temperature Vitrified Bodies; E. D. Lynch, et al., Apr. 1950.

Engineering Properties of Ceramics, Databook to Guide Materials Selection for Structural Applications, J. F. Lynch, et al., TR 66-52, Jun. 1966.

Reactions in Silica-Alumina Mixtures, Richard R. West, et al., Apr. 1958.

Synthesis and Mechanical Properties of Stoichiometric Aluminum Silicate (Mullite), K. S. Mazdiyasni, et al., Dec. 1972.

Coors Porcelain Company letter to Halliburton Services, Inc. dated Aug. 4, 1978 with Proposal to Supply Proppant.

Unimin Brochure, Unimin Canada Ltd., Mar. 1991.

Role of Impurities on Formation of Mullite from Kaolinite and $Al_2O_3$-$S_1O_2$ Mixtures, Johnson, Sylvia M. et al., Ceramic Bulletin, vol. 61, No. 8 (1982), pp. 838-842.

Bauxite and Alumina, Luke H. Baumgardner, et al., Minerals Yearbook, 1987, vol. 1.

The Industrial Uses of Bauxite, N. V. S. Knibbs, D.Sc., 1928.
Bauxite, Cyril S. Fox, 1927.
Document entitled "Feb., Mar., Apr. 1998: Commercial Activity", with Exhibits A-D.
Document entitled "Jul. 1998: Commercial Activity,", with Exhibit E.
Document entitled "Sep. 2001: Commercial Activity", with Exhibit F.
ScalePROP brochure, Schlumberger, Jan. 2002.
Rickards, A. R., et al.; "High Strength, Ultra Lightweight Proppant Development Lends New Dimensions to Hydraulic Fracturing Applications", SPE 84308, Oct. 7, 2003.
Didion International, Inc.; Mold & Core Consumables; http://www.moderncasting.com/MoreInfo/0602/FMI_Article_08.asp; Dec. 27, 2002.
Itochu Ceratech Corp.; Ceramics and Minerals Department; http://www.itc-cera.co.jp/english/cera.htm; Jun. 8, 2002.
Enprotech Corp; About Enprotech; http:www.enprotech.com/aboutus.html; Copyright 2004.
Spraying Systems Co.; Air Atomizing Nozzles 1/2J Pressure Spray Set-ups Internal Mix; Air Atomizing Nozzles 1/2J Series External Mix Set-ups; Air Atomizing Nozzles 1/2J Siphon/Gravity-Fed Spray Set-ups; pp. 358-362; Copyright 2003.
Spraying Systems Co.; Air Atomizing Nozzles 1/8J and 1/4J Set-ups External Mix; pp. 282-285; Copyright 2003.
Spraying Systems Co.; Air Atomizing Nozzles Basic Information; pp. 268-269; Copyright 2003.
Spraying Systems Co.; Engineer's Guide to Spray Technology; Copyright 2000.
Environmental Conservation-Oriented Businesses; Itochu Corporation; pp. 11-16; Jul. 2004.
Itochu Ceratech Corporation; CERABEADS—Spherical Ceramic Sand; http://exhibits.gifa.de/exh/GMTN2003/e/3231240; Mar. 13, 2005.
Naigai Ceramics Co., Ltd.; Naigai Cerabeads 60; Aug. 1986.
"rock." Encyclopedia Britannica 2007. Encyclopedia Britannica Article. Jun. 27, 2007.
Perry's Chemical Engineers' Handbook Section 12, 7th Edition, 1997, pp. 12-81 to 12-90.
Office Action mailed Jan. 21, 1992, by the USPTO regarding U.S. Appl. No. 07/769,584.
Notice of Allowance mailed Sep. 1, 1992, by the USPTO regarding U.S. Appl. No. 07/769,584.
Notice of Allowance mailed Jan. 7, 2005, by the USPTO regarding U.S. Appl. No. 10/268,169.
Notice of Allowance mailed Dec. 28, 2005, by the USPTO regarding U.S. Appl. No. 10/268,169.
Office Action mailed Sep. 7, 2006, by the USPTO regarding U.S. Appl. No. 11/103,777.
Advisory Action mailed Nov. 27, 2006, by the USPTO regarding U.S. Appl. No. 11/103,777.
Office Action mailed Feb. 27, 2007, by the USPTO regarding U.S. Appl. No. 11/103,777.
Office Action mailed Aug. 15, 2006, by the USPTO regarding U.S. Appl. No. 11/178,081.
Office Action mailed Jan. 30, 2007, by the USPTO regarding U.S. Appl. No. 11/178,081.
Advisory Action mailed Apr. 11, 2007, by the USPTO regarding U.S. Appl. No. 11/178,081.
Office Action mailed May 16, 2007, by the USPTO regarding U.S. Appl. No. 11/178,081.
Notice of Allowance mailed Feb. 5, 2008, by the USPTO regarding U.S. Appl. No. 11/178,081.
Office Action mailed Feb. 7, 2007, by the USPTO regarding U.S. Appl. No. 11/192,711.
Office Action mailed Jul. 13, 2007, by the USPTO regarding U.S. Appl. No. 11/192,711.
Office Action mailed Nov. 15, 2007, by the USPTO regarding U.S. Appl. No. 11/192,711.
Office Action mailed Aug. 16, 2007, by the USPTO regarding U.S. Appl. No. 11/226,476.
Office Action mailed Feb. 20, 2008, by the USPTO regarding U.S. Appl. No. 11/226,476.
Office Action mailed Sep. 5, 2008, by the USPTO regarding U.S. Appl. No. 12/032,301.
Office Action mailed Feb. 17, 2009, by the USPTO regarding U.S. Appl. No. 12/032,301.
Office Action mailed Apr. 8, 2009, by the USPTO regarding U.S. Appl. No. 12/123,189.
U.S. Appl. No. 12/253,681, filed Oct. 17, 2008, entitled "Method for Producing a Proppant Using a Dopant".
International Search Report mailed Aug. 29, 2006, by the ISA/US regarding International Application No. PCT/US2005/024339.
Written Opinion mailed Aug. 29, 2006, by the ISA/US regarding International Application No. PCT/US2005/024339.
International Preliminary Report on Patentability mailed Jan. 18, 2007, by the IB regarding International Application No. PCT/US2005/024339.
International Search Report mailed Oct. 4, 2006, by the ISA/US regarding International Application No. PCT/US2005/033092.
Written Opinion mailed Oct. 4, 2006, by the ISA/US regarding International Application No. PCT/US2005/033092.
International Preliminary Report on Patentability mailed Apr. 20, 2007, regarding International Application No. PCT/US2005/033092.
International Search Report mailed Jul. 13, 2007, by the ISA/US regarding International Application No. PCT/US2006/007308.
Written Opinion mailed Jul. 13, 2007, by the ISA/US regarding International Application No. PCT/US2006/007308.
International Preliminary Report on Patentability mailed Sep. 20, 2007, by the IB regarding International Application No. PCT/US2006/007308.
International Search Report mailed Jun. 8, 2007, by the Isa/US regarding International Application No. PCT/US2006/029234.
Written Opinion mailed Jun. 8, 2007, by the ISA/US regarding International Application No. PCT/US2006/029234.
International Preliminary Report on Patentability mailed Feb. 7, 2008, by the IB regarding International Application No. PCT/US2006/029234.
International Search Report mailed Dec. 27, 2007, by the ISA/US regarding International Application No. PCT/US2007/073247.
Written Opinion mailed Dec. 27, 2007, by the ISA/US regarding International Application No. PCT/US2007/073247.
International Preliminary Report on Patentability mailed Jan. 13, 2009, by the IB regarding International Application No. PCT/US2007/073247.
International Search Report mailed Feb. 22, 2008, by the ISA/US regarding International Application No. PCT/US2007/077290.
Written Opinion mailed Feb. 22, 2008, by the ISA/US regarding International Application No. PCT/US2007/077290.
International Preliminary Examination Report mailed Feb. 20, 2009, by the IB regarding International Application No. PCT/US2007/077290.
International Search Report mailed Oct. 6, 2008, by the ISA/US regarding International Application No. PCT/US2008/069012.
Written Opinion mailed Oct. 6, 2008, by the ISA/US regarding International Application No. PCT/US2008/069012.
Correspondence from foreign counsel dated Nov. 29, 2007, regarding Office Action issued in connection with Eurasian Patent Application No. 200700296.
Correspondence from foreign counsel dated Feb. 29, 2008, regarding Office Action issued in connection with Eurasian Patent Application No. 200700583.
Correspondence from foreign counsel dated May 9, 2008, regarding Office Action issued in connection with Eurasian Patent Application No. 200700583.
Correspondence from foreign counsel dated Sep. 15, 2008, regarding Office Action issued in connection with Eurasian Patent Application No. 200700583.
Correspondence from foreign counsel dated Jul. 10, 2008, regarding Office Action issued in connection with Eurasian Patent Application No. 200701830.
Correspondence from foreign counsel dated Aug. 25, 2008, regarding Office Action issued in connection with Eurasian Patent Application No. 200800008.

* cited by examiner

METHODS FOR PRODUCING SINTERED PARTICLES FROM A SLURRY OF AN ALUMINA-CONTAINING RAW MATERIAL

CROSS REFERENCE TO RELATED APPLICATIONS

This patent application is a non-provisional of United States Provisional Patent Application No. 60/657,528, filed Mar. 1, 2005 entitled "Method for Producing Sintered Particles from a Slurry of an Alumina Containing Raw Material," which is incorporated herein by reference in its entirety.

BACKGROUND

The present invention relates to methods for producing substantially round, spherical and sintered particles from a slurry of an alumina-containing raw material. The methods described herein provide for nucleation and promotion of the growth of mullite crystals in the sintered particles, which in turn contributes strength to the sintered particles. The sintered particles are prepared from a slurry of a calcined, uncalcined, or partially calcined raw material having an alumina content of more than 55% by weight, and a mullite growth promoter in an amount of from about 2 to about 10% dry weight of the total solids in the slurry. The sintered particles produced according to methods described herein are suitable for use as a propping agent or as a foundry media.

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

The foundry industry has traditionally used inexpensive natural sands for casting. However, natural sands exhibit large thermal expansion characteristics, which means that the core boxes and molds must be highly pre-engineered to allow for the expansion of the sand when it comes in contact with the heat from the molten metal. Many times, despite pre-engineering efforts, expansion related defects occur resulting in scrapped parts or parts requiring high cleaning cost to correct. In addition, natural sands contain crystalline quartz silica, which is a health and environmental hazard within the workplace. Also, natural sands are mined, which results in product inconsistencies that lead to casting inconsistencies. Furthermore, most silica sands are not well rounded and are somewhat friable resulting in low flowability and compaction, high breakdown and high solid waste emissions. Specialty sands, such as zircon and chromite, have low expansion properties but are very dense, making core handling more difficult and requiring more resin to obtain adequate tensile strengths. These products are mined and present concerns of availability, consistency and sizing flexibility. They also tend to be somewhat friable.

DETAILED DESCRIPTION

Figure 1:
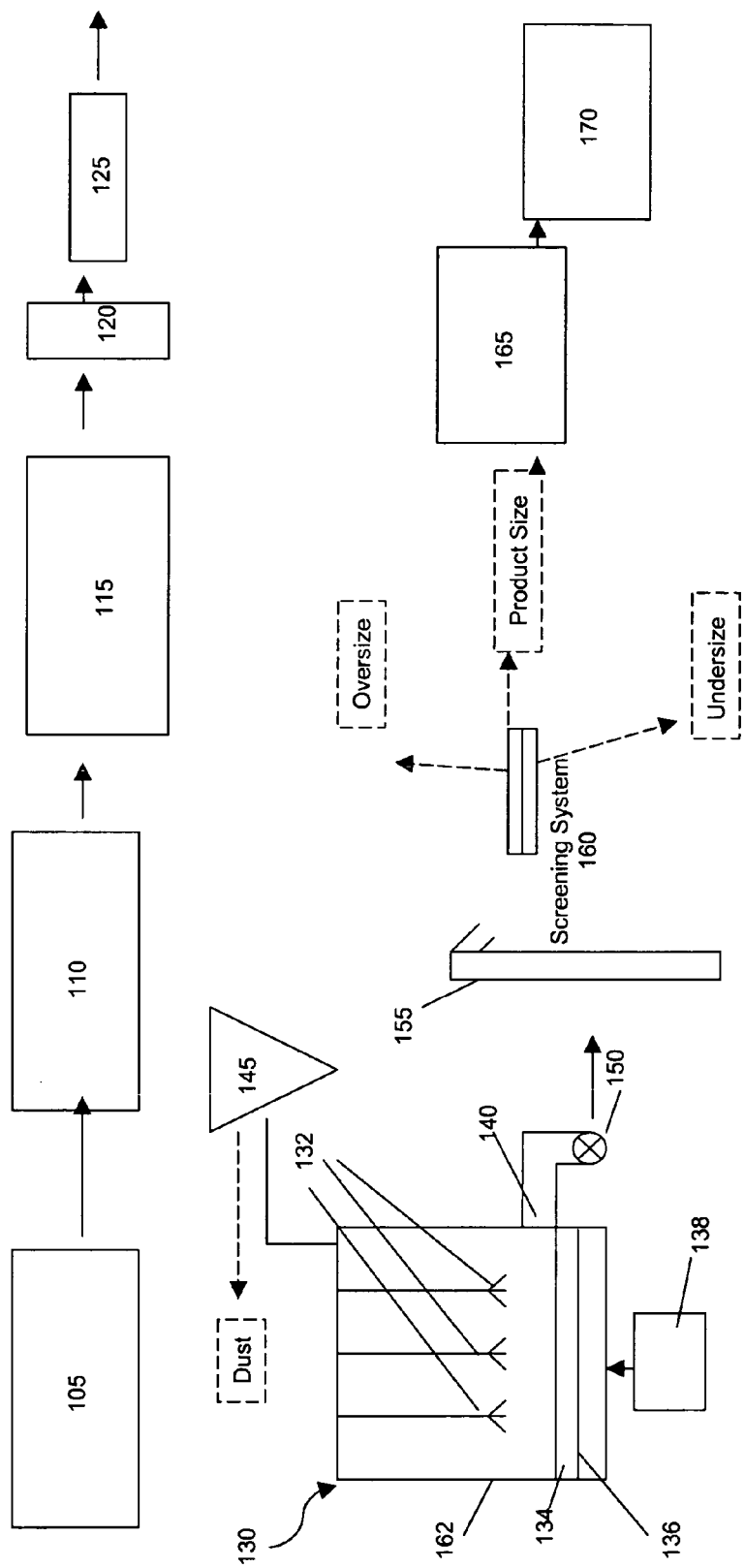
FIG. 1 is a schematic illustration of a system for preparing substantially round and spherical particles from a slurry as described herein.

Described herein are methods for preparing substantially round and spherical particles from a slurry of an alumina-containing raw material. The alumina-containing raw material can be calcined, uncalcined, or partially calcined.

The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The term "uncalcined" and related forms refers to a raw material that contains a residual amount of naturally-occurring volatiles, for example, from about 10 to about 40 wt. %, which may include organics and chemically bound water (also referred to as "water of hydration").

The term "calcined" and related forms refers to a raw material that has been treated with temperatures and times sufficiently high enough to remove organic material and to substantially remove water of hydration.

The alumina-containing raw material may be a substantially homogenous raw material or a blend of raw materials (collectively referred to as "raw material" where appropriate). The raw material has an alumina content of greater than about 55% by weight (on a calcined basis). In certain examples, the raw material has an alumina content of greater than about 60%, greater than about 65%, greater than about 70%, or greater than about 75% by weight (on a calcined basis). In certain examples, the raw material has an alumina content of up to about 80% by weight (on a calcined basis). Exemplary raw materials include but are not limited to bauxite, bauxitic kaolin, gibbsitic bauxite and diaspore bauxite. A raw material having less than 55% by weight alumina, which could be certain kaolin, diaspore, burley and flint clays, can be blended with a higher alumina raw material, such as a bauxite, to result in a raw material suitable for use with the methods described herein.

The sintered particles are prepared from a slurry of the alumina-containing raw material and a mullite growth promoter, where the mullite growth promoter is present in an amount of from about 2 to about 10% dry weight of the total solids in the slurry. Suitable mullite growth promoters include iron oxide. According to certain examples, a substantially homogenous raw material having an iron oxide content in a range of from about 2 to about 10% dry weight of the total solids in the slurry can be used. In other examples, a blend of raw materials can be prepared such that the blended raw material has an iron oxide content of about 2 to about 10% dry weight of the total solids in the slurry. As an alternative to blending raw materials prior to making the slurry, separate slurries can be prepared as described herein, and the prepared slurries can be blended and fed through a fluidizer as described herein.

In still other examples, iron oxide is added to a substantially homogenous raw material or a blend of raw materials such that an iron oxide content in an amount of from about 2 to about 10% dry weight of the total solids in the slurry results. In certain examples, iron oxide is present in the raw material or is added to the raw material to result in an iron oxide content of from about 3 to about 7% by weight, or from about 3 to about 6% by weight, or from about 3 to about 5% by weight, of the total solids in the slurry. In still other examples, the iron oxide content is from about 5 to about 7% by weight of the total solids in the slurry.

In certain examples, magnesium oxide, manganese oxide, titanium oxide and oxides of the Lanthanide series of rare earth metals could be added to the slurry as a sintering aid.

As described herein, substantially round and spherical particles are prepared with a slurry of alumina-containing raw material. In certain examples, the particles have a specific gravity between about 2.70 and about 3.50 g/cm$^3$, and a bulk density of between about 1.55 and 1.95 g/cm$^3$. In other examples, substantially round and spherical particles produced according to methods described herein have a specific gravity of about 2.90, 3.10 or 3.30 g/cm$^3$, or a bulk density of about 1.65, 1.70, 1.75, 1.80 or 1.85 g/cm$^3$.

In certain embodiments, the present method can be used to make substantially round and spherical particles having a crush strength at 10,000 psi of from about 4 percent to about 7 percent, and a short term conductivity at 10,000 psi of from about 3000 mD-ft to about 3800 mD-ft.

In still other examples, the present method can be used to make substantially round and spherical particles having an ASG of from about 2.50 to about 3.70. In still other examples, substantially round and spherical particles having an ASG of from about 3.00 to about 3.50 are produced.

According to other examples, substantially round and spherical particles having a size in a range between about 6 and 270 U.S. Mesh after sintering can be produced. According to still other examples, substantially round and spherical particles having a size in a range of from about 3.35 to about 0.05 millimeters can be produced. According to yet other examples, the size of the particles is expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

Generally, relatively smaller particles can be used as foundry media, while relatively larger particles can be used as propping agents. Regardless of size, however, the use of a mullite growth promoter in the manufacture of the particles produces particles having a mullite content that enhances the strength of the particles as compared to particles made according to conventional methods. The methods described herein provide for nucleation and promotion of the growth of mullite crystals in the sintered particles, which in turn contributes strength to the sintered particles. Expansion of mullite is significantly lower than the expansion of cristobalite or corundum, thus, the thermal expansion property of a media as described herein could also be low enough for use as a foundry media.

The mullite content of sintered particles as descried herein can be theoretically calculated based on the amount of alumina in the particles. Generally, particles having an alumina content of about 72% by weight would theoretically have about 100% mullite, although the actual mullite content would be affected by the balance of oxides in the particles. X-ray diffraction analysis can be used to determine the actual mullite content of the particles.

Exemplary embodiments of the present disclosure include a composition comprising from about 55% to about 65% alumina, from about 25% to about 35% silica, and an iron oxide content of from about 2% to about 10% (balance of alkalis), which produces a media that has a mullite content above 85%. In addition, such a media would have a low thermal expansion property, such as less than about 0.55% linear change (about 5.0×10$^{-6}$ in/in° C. coefficient of thermal expansion) at 1100° C. and a minor crystalline silica content. In other examples, a composition comprising from about 55% to about 80% alumina, from about 10% to about 35% silica, and an iron oxide content of from about 2% to about 10% (balance of alkalis), which produces a media that has a mullite content above 75%, as corundum would begin to form. In other exemplary embodiments, a 55% kaolin clay having about 45% alumina and about 1% iron oxide could be blended with about 45% bauxitic ores having about 85% alumina and about 7% iron oxide to yield roughly a 60% alumina, 30% silica and 4% iron oxide product. This product would have properties of about 0.42% linear change (about 4.6×10$^{-6}$ in/in° C. coefficient of thermal expansion) at 1100° C. and a minor crystalline silica content.

According to certain examples described herein, the substantially round and spherical particles are made in a continuous process, while in other examples, the particles are made in a batch process.

Referring now to FIG. 1, an exemplary system for implementing a continuous process for preparing substantially round and spherical particles from a slurry is illustrated. The exemplary system illustrated in FIG. 1 is similar in configuration and operation to that described in U.S. Pat. No. 4,440,866, the entire disclosure of which is hereby incorporated by reference herein. The operations performed by the exemplary system illustrated in FIG. 1 can also be used to describe a method for making the particles according to a batch process, as is disclosed further in Example 1.

In the system illustrated in FIG. 1, a calcined, uncalcined, or partially calcined raw material having an alumina content of greater than about 55% by weight (on a calcined basis) is passed through a shredder 105 to chop the raw material into small chunks. In some examples, the shredder will be optional if the raw material as mined, or as received, (referred to herein as "untreated" raw material) is of such consistency that it can be processed as described herein without shredding.

Raw material fed through a shredder such as is illustrated in FIG. 1, is referred to as "treated" raw material. As noted above, the raw material may have an iron oxide content of from about 2 to about 10% by weight inherently, or iron oxide may be added to the raw material such that an iron oxide content of from about 2 to about 10% dry weight of the total solids in the slurry results. If iron oxide is to be added to the raw material, it is preferably added after the raw material has been shredded, for example, in a subsequent blunging or mixing step as will be discussed further herein.

In certain examples, the shredder will break the raw material down into pieces having a diameter of less than about five inches, although pieces having smaller and larger diameters can be further processed into a slurry as described herein. Shredders and numerous other devices for breaking up such raw materials, as well as commercial sources for same, are known to those of ordinary skill in the art.

The shredded raw material is fed to a blunger 110, where it is further broken down, and water is added to form a slurry. In a continuous process, the raw material and water is provided to the blunger as a continuous feed. Blungers and similar devices for making slurries of such materials, as well as commercial sources for same, are known to those of ordinary skill in the art.

If the iron oxide content of the raw material is such that supplemental iron oxide should be added to result in an iron oxide content of about 2 to about 10% dry weight of the total solids in the slurry, the iron oxide is preferably added to the blunger. In certain examples, the supplemental iron oxide is hematite iron oxide ($Fe_2O_3$), while in other examples, the iron oxide is another form of iron oxide, such as FeO and $Fe_3O_4$. Thus, iron oxide can be generically referred to as $Fe_xO_y$. If a mullite growth promoter other than iron oxide is selected, then the selected mullite growth promoter is preferably added to the slurry in the blunger, in the same manner as the iron oxide.

The amount of water added to the blunger 110 is that amount that results in the slurry having a solids content in the range of from about 40% to about 60% by weight. In certain examples, the solids content of the slurry is from about 45% to about 55% by weight. In still other examples, the solids content of the slurry is about 50% by weight. The water added to the blunger can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are within the ability of those of ordinary skill in the art.

In certain examples, dispersant and a pH-adjusting reagent are added to the slurry in the blunger to achieve a target viscosity of the slurry, as discussed further below. In other examples, either the raw material or the dispersant are such that a target viscosity can be attained without the use of a pH-adjusting reagent.

If a pH-adjusting reagent is used, then the amount of pH-adjusting reagent added to the slurry is that amount which gives the slurry a pH in the range of from about 8 to about 11. In certain examples, the pH of the slurry is about 9, about 9.5, about 10 or about 10.5. The pH of the slurry can be periodically analyzed by a pH meter, and the amount of pH-adjusting reagent fed to the slurry adjusted to maintain the desired pH. Methods for analyzing the pH of a slurry and adjusting a feed of pH-adjusting reagent are within the ability of those of ordinary skill in the art.

Dispersant is added to the slurry on a dry weight percent based on the weight of the raw material, prior to the addition of supplemental iron oxide, if any, or other additives. In certain examples, the amount of dispersant used is up to about 0.5 wt. % based on the dry weight of the raw material. In other words, if the raw material is bauxite in an amount of 100 pounds dry weight, then dispersant can be added in an amount of up to about 0.5 pounds. In other examples, the dispersant is added in a range of from about 0.1 to about 0.2 wt. %, about 0.2 to about 0.3 wt. %, or about 0.3 to about 0.4 wt. %, based on the dry weight of the raw material. In still other examples, the dispersant is added in an amount of about 0.15 wt. %, about 0.25 wt. %, about 0.35 wt. % or about 0.45 wt. %, of the dry weight of the raw material.

Exemplary materials suitable for use as dispersants in the methods described herein include but are not limited to sodium polyacrylate, tetra sodium pyrophosphate, tetra potassium pyrophosphate, polyphosphate, ammonium citrate, ferric ammonium citrate, and polyelectrolytes such as a composition of ammonium polymethacrylate and water commercially available from R.T. Vanderbilt Company, Inc., Norwalk Conn., under the tradename DARVAN C. Generally, the dispersant can be any material that will reduce the viscosity of the slurry to a target viscosity such that the slurry can be subsequently processed through one or more pressure nozzles of a fluidizer. In certain examples, the target viscosity is less than 100 centipoises (cps) (as determined on a Brookfield Viscometer with a #61 spindle). In other examples, the target viscosity can be more than 100 cps.

The target viscosity is that viscosity that can be processed through a given type and/or size of the pressure nozzle in the subsequent fluidizer, without becoming clogged. Generally, the lower the viscosity of the slurry, the better it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

Optionally, a defoamer can be added to the slurry in the blunger. If defoamer is used, it can be added to the slurry in any amount that reduces or prevents any equipment problems caused by foaming of the slurry. Those of ordinary skill in the art can identify and select a suitable defoamer and amount of defoamer to use in the processes described herein through routine experimentation.

The blunger 110 mixes the raw material, water, pH-adjusting reagent, dispersant, any supplemental iron oxide or other mullite growth promoter (and optional defoamer) until a slurry is formed. The amount of time it takes for the slurry to form is understandably dependent on factors such as the size of the blunger, the speed at which the blunger is operating, and the amount of material in the blunger.

From the blunger 110, the slurry is fed to a tank 115, where the slurry is continually stirred, and a binder is added in an amount of from about 0.25 to about 5.0% by weight, based on the total dry weight of the raw material and any supplemental iron oxide. In certain examples, the binder is added in an amount of from about 0.50 to about 1.50% by weight, about 1.50 to about 2.50% by weight, about 2.50 to about 3.50% by weight, or about 3.50 to about 4.50% by weight, based on the total dry weight of the raw material and any supplemental iron oxide. Suitable binders include but are not limited to polyvinyl acetate, polyvinyl alcohol (PVA), methylcellulose, dextrin and molasses. In certain examples, the binder is a PVA binder having a molecular weight in a range of from about 20,000 to 100,000 Mn. "Mn" is a unit known to those of ordinary skill in the art to indicate the number length average for determining the molecular weight of a chained molecule.

The tank 115 maintains the slurry created by the blunger 110. However, the tank 115 stirs the slurry with less agitation than the blunger, so as to mix the binder with the slurry without causing excessive foaming of the slurry or a viscosity increase in the slurry such that the slurry cannot be subsequently fed through pressurized nozzles of a fluidizer.

In another example, the slurry is not fed to a tank, rather, the binder can be added to the slurry in the blunger. If such an alternative is used, then the blunger should have variable speeds, including a high speed to achieve the high intensity mixing for breaking down the raw material into a slurry form, and a low speed to mix the binder with the slurry without causing the above-mentioned excessive foaming or viscosity increase.

Referring again to the tank 115 illustrated in FIG. 1, the slurry is stirred in the tank, after addition of the binder, for an amount of time sufficient to allow for the binder to become thoroughly mixed throughout the slurry. In certain examples, the amount of time the slurry is stirred in the tank is up to about 30 minutes after the binder has been added. In other examples, the slurry is stirred in the tank 115 for at least about 30 minutes. In still other examples, the slurry can be stirred in the tank for more than about 30 minutes after addition of the binder.

Tank 115 can also be a tank system comprised of one or more tanks, for example, the tank may be comprised of two, three, or more tanks. Any configuration of tanks or number of tanks that allows for the binder to become thoroughly mixed throughout the slurry is sufficient. In a continuous process, water, and one or more of dust, oversize particles, or undersize particles from a subsequent fluidizer or other apparatus can be added to the slurry in the tank 115.

From the tank 115, the slurry is fed to a heat exchanger 120, which heats the slurry to a temperature in a range of from about 25 to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized raw material down to a target size suitable for feeding to the fluidizer. In certain examples, the target size is a size of less than 230 mesh. In other examples, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles greater than the target size from the slurry. For example, the screening system can include one or more screens, which are selected and positioned so as to screen the slurry to less than the target size.

Referring again to FIG. 1, fluidizer 130 is of conventional design, as described in, e.g., U.S. Pat. No. 3,533,829 and in British Pat. No.1,401,303. Fluidizer 130 includes at least one atomizing nozzle 132 (three nozzles 132 are illustrated in FIG. 1), which is a pressure nozzle of conventional design. In other examples, one or more two-fluid nozzles are suitable. The design of such nozzles is well known, e.g. from K. Masters: "Spray Drying Handbook", John Wiley and Sons, New York (1979).

Fluidizer 130 further includes a particle bed 134, which is supported by a plate 136, which can be a perforated, straight or directional plate. Hot air flows through the plate 136. The particle bed 134 comprises seeds from which particles of a target size can be grown. If a perforated or straight plate is used, then the seeds also serve to obtain plug flow in the fluidizer. Plug flow is a term known to those of ordinary skill in the art, and can generally be described as a flow pattern where very little back mixing occurs. The seeds are particles that are smaller than the target size for particles made according to the present methods. In certain examples, the seed comprises less than about 20%, less than about 15%, less than about 10%, or less than about 5% of the total particle volume of a particle formed therefrom. Slurry is sprayed, under pressure, through the atomizing nozzle 132, and the slurry spray coats the seeds to form particles that are substantially round and spherical.

External seeds can be placed on the perforated plate 136 before atomization of the slurry by the fluidizer begins. If external seeds are used, the seeds can be prepared in a slurry process similar to that illustrated in FIG. 1, where the seeds are simply taken from the fluidizer at a target seed size. External seeds can also be prepared in a high intensity mixing process such as that described in U.S. Pat. No. 4,879,181 and Example 1 herein.

According to certain examples, external seeds are made from either a raw material having at least the same alumina content as the raw material used to make the slurry, or from a raw material having more or less alumina than the raw material used to make the slurry. In the exemplary batch process described below in Example 1, external seeds having an alumina content greater than that of the raw material used to make the slurry are used to seed the particle bed in the fluidizer. In certain examples, the slurry will have an alumina content that is at least. 10, at least 20, or at least 30% less than that of the seeds. In other examples, the external seeds could have an alumina content less than that of the slurry, such as least 10, at least 20, or at least 30% less than that of the slurry.

Alternatively, seeds for the particle bed are formed by the atomization of the slurry, thereby providing a method by which the slurry "self-germinates" with its own seed. According to one such example, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter or a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to FIG. 1, hot air is introduced to the fluidizer 130 by means of a fan and an air heater, which are schematically represented at 138. The velocity of the hot air passing through the particle bed 134 can be in a range of from about 0.9 to about 1.5 meters/second, and the depth of the particle bed 134 can be in a range of from about 2 to about 60 centimeters. The temperature of the hot air when introduced to the fluidizer 130 can be in a range of from about 250 to about 650° C. The temperature of the hot air as it exhausts from the fluidizer 130 is less than about 250° C., and preferably less than about 100° C.

The distance from the atomizing nozzles 132 to the plate 136 is adjustable, and the nozzles are preferably positioned a rather short distance above the surface of the particle bed 134. The exact position of the nozzles will in each individual case be fixed with due regard to the consideration that when the distance from the nozzles to the surface of the particle bed is too great, undesirable dust is formed because the atomized feed droplets are dried to too high an extent before they reach the particle bed. On the other hand, if the distance from the nozzles to the surface of the particle bed is too small, undesirably irregular and coarse particles are formed. Therefore, the position of the nozzles is adjusted to avoid the formation of dust and irregular, coarse particles on the basis of an analysis of powder sampled from the fluidizer.

The particles formed by the fluidizer accumulate in the particle bed 134. In a continuous process, the particles formed by the fluidizer 130 are withdrawn through an outlet 140 in response to the level of product in the particle bed 134 in the fluidizer 130, so as to maintain a given depth in the particle bed. A rotary valve 150 conducts particles withdrawn from the fluidizer 130 to an elevator 155, which feeds the particles to a screening unit 160, where the particles are separated into one or more fractions, for example, an oversize fraction, a product fraction, and an undersize fraction.

The oversize fraction exiting the screening unit 160 includes those particles that are larger than the desired product size. In a continuous process, these particles are optionally recycled to tank 115, where at least some of the particles can be broken down and blended with slurry in the tank. Alternatively, oversize particles can be broken down and recycled to the particle bed 134 in the fluidizer 130. The undersized fraction exiting the screening unit 160 includes those particles that are smaller than the desired product size. In a continuous process, these particles are optionally recycled to the fluidizer 130, where they can be fed through an inlet 162 as seeds or as a secondary feed to the fluidizer.

The product fraction exiting the screening unit 160 includes those particles having the desired product size. These particles are sent to a pre-sintering device 165, for example, a calciner, where the particles are dried or calcined prior to sintering. In certain examples, the particles are dried to a moisture content of less than about 18% by weight, or less than about 15, about 12, about 10, about 5, or about 1% by weight.

After drying and/or calcining, the particles are fed to a sintering device 170, in which the particles are sintered for a period sufficient to enable recovery of sintered, substantially round and spherical particles having one or more of a desired apparent specific gravity, bulk density, and crush strength. As an alternative, the pre-sintering device 165 can be eliminated if the sintering device 170 can provide sufficient calcining and/or drying conditions (i.e., drying times and temperatures that dry the particles to a target moisture content prior to sintering), followed by sufficient sintering conditions.

The specific time and temperature to be employed for sintering is dependent on the starting ingredients and the desired density for the sintered particles. In some examples, sintering device 170 is a rotary kiln, operating at a temperature in a range of from about 1000° C. to about 1600° C., for a period of time in a range of from about 5 to about 90 minutes. In certain examples, a rotary kiln is operated at a temperature of about 1000° C., about 1200° C., about 1300° C., about 1400° C. or about 1500° C. In certain examples, the particles have a residence time in the sintering device of about 50 to about 70 minutes, or about 30 to about 45 minutes. After the particles exit the sintering device 170, they can be further screened for size, and quality control tests can be performed on the particles before the final product is shipped to the consumer.

Example 1 provides an illustrative example of a batch process implemented in a manner similar to the system described above and illustrated in FIG. 1.

EXAMPLE 1

Generally according to a batch-wise example of the continuous method described above, Slurry Nos. 1-3 were prepared for this Example 1.

Each of the slurries was prepared from a raw material comprising an uncalcined bauxite having a chemistry as reported in Table 1. The chemical analysis of the slurry's raw material was determined by inductively coupled plasma (ICP), which is an analytical method known to those of ordinary skill in the art and therefore need not be detailed herein. Generally, however, a sample of the uncalcined bauxite was dried at about 100° C. to drive off water. The dried sample was then ground and heated to about 1000° C. to drive off chemically bound water and other compounds. Those of ordinary skill in the art refer to this process as "loss on ignition" (LOI). After LOI, the dried sample was prepared for ICP analysis by mixing with nitric acid and the analysis was conducted according to methods known to those of ordinary skill in the art.

TABLE 1

| ICP Chemistry (wt. %) of Raw Material for Slurries | | | | | | |
|---|---|---|---|---|---|---|
| $Al_2O_3$ | $SiO_2$ | $K_2O$ | CaO | $TiO_2$ | $Fe_2O_3$ | MgO |
| 70.00 | 25.50 | 0.013 | 0.016 | 3.82 | 0.61 | 0.037 |

Slurries of the raw material were prepared by mixing the raw material with water, a pH-adjusting reagent, and a dispersant in a lab blunger, which simulates blunger 110. Lab blungers are known to those of ordinary skill in the art. Suitable lab blungers are readily available from a variety of commercial sources, and can be as simple as a tank with baffles and a mixer for breaking down the raw material.

Iron oxide in the amount reported in Table 2, which is based on a dry weight percent of total solids in the slurry, was also added to the lab blunger. The iron oxide used in this Example 1 was a 98% pure iron oxide, which is readily available from a variety of commercial sources.

Water was added in an amount sufficient to achieve and maintain a solids content in the range of 40% to 60% by weight. In this Example 1, a sufficient amount of water was added to achieve a targeted solids content of about 50%. The measured solids content of each slurry in this Example 1 is reported in Table 2. The solids content reported in Table 2 was determined just prior to the slurry being fed to a subsequent fluidizer, however, the solids content of the slurry is tested periodically throughout this batch process to ensure that the targeted solids content is being achieved. The solids contents reported in Table 2 were determined by an Ohaus Model MB 35 moisture balance scale, generally operated according to manufacturer's procedures for its operation.

Ammonia was added as the pH-adjusting reagent to achieve a pH in the range of about 8 to about 11. The pH of each slurry is reported in Table 2. The pH reported in Table 2 was determined just prior to the slurry being fed to a subsequent fluidizer, however, the pH of the slurry is tested periodically throughout this batch process with a ThermoOrion Model 420 bench top pH meter to ensure that the targeted pH range is being achieved. The pH of the slurry was determined just prior to fluidizing with a double junction water-proof pH tester generally operated according to manufacturer's procedures for its operation.

Sodium polyacrylate having an average molecular weight of about 3600 Daltons was added as the dispersant in an amount of about 0.15% of the dry weight of the uncalcined bauxite raw material. The viscosity values reported in Table 2 were determined just prior to the slurry being fed to a subsequent fluidizer. However, the viscosity is tested periodically throughout this batch process to ensure that the slurry will have a viscosity that can be fed through a subsequent fluidizer. The viscosity reported in Table 2 was determined with a Brookfield viscometer with a number 61 spindle, which is commercially available from Brookfield Engineering Laboratories, Middleboro, Mass., and generally operated according to manufacturer's procedures for its operation.

The slurry, which comprised water, uncalcined bauxite, supplemental iron oxide, pH-adjusting reagent and dispersant, was mixed in the lab blunger for about 30 minutes, and then screened to about 200 mesh.

After screening to about 200 mesh, the slurry was then transported to a barrel fitted with a low speed agitator, which stirred the slurry as a simulation of tank 115. Lab tanks and similar devices for simulating tank 115 are readily available from a variety of commercial sources. Suitable devices have a low speed agitator capable of stirring the slurry without causing excessive foaming or viscosity increase. A PVA binder having a molecular weight around 25,000 Mn was solubilized and added to the slurry in a dry weight amount of about 1.75% of the total dry weight of the raw material (the uncalcined bauxite) and the supplemental iron oxide. This type of PVA binder is commercially available as a dry powder from a variety of sources, and can be solubilized according to methods known to those of ordinary skill in the art or with routine experimentation. After the binder was added, stirring of the slurry continued for about 30 minutes.

The chemical analysis of Slurry Nos. 2 and 3 was determined by inductively coupled plasma (ICP), according to methods known to those of ordinary skill in the art, which are generally described above. The results of the ICP analysis are reported in Table 2, where "n/a" indicates that the property was not evaluated.

TABLE 2

Properties of Slurries Used in Fluidizer to Produce Sample Nos. 1, 2 and 3

|  | Slurry No. 1 | Slurry No. 2 | Slurry No. 3 |
| --- | --- | --- | --- |
| Slurry Components |  |  |  |
| Raw Material (wt. %) | 96 | 96 | 95 |
| Added $Fe_2O_3$ (wt. %) | 4 | 4 | 5 |
| Slurry Properties |  |  |  |
| % Moisture | n/a | 50.35 | 50.27 |
| LOI before ICP | n/a | 26.40 | 23.85 |
| Solids (wt. %) | 48.8 | 49.9 | 50.1 |
| pH | 9.8 | 9.4 | 10.4 |
| Viscosity @ 60 rpm (cp) | 36.1 | 30.0 | 27.0 |
| Slurry ICP Chemistry (wt. %) |  |  |  |
| $Fe_2O_3$ | n/a | 5.59 | 7.39 |
| CaO | n/a | 0.037 | 0.029 |
| MgO | n/a | 0.065 | 0.083 |
| $TiO_2$ | n/a | 3.66 | 3.32 |
| $K_2O$ | n/a | 0.001 | 0.001 |
| $SiO_2$ | n/a | 22.06 | 27.06 |
| $Al_2O_3$ | n/a | 68.05 | 61.69 |
| $ZrO_2$ | n/a | 0.11 | 0.09 |
| $P_2O_5$ | n/a | 0.057 | 0.048 |
| $Na_2O$ | n/a | 0.110 | 0.110 |

The slurry was fed to a trial fluidizer, which simulated the heat exchanger, fluidizer, pump, dust collector, air heater and fan described above with respect to FIG. 1.

The particle bed in the trial fluidizer comprised external seeds having the properties reported in Table 3, where Seed No. 1 indicates the seed used in the particle bed when Slurry No. 1 was processed, Seed No. 2 indicates the seed used in the particle bed when Slurry No. 2 was processed, and Seed No. 3 indicates the seed used in the particle bed when Slurry No. 3 was processed. The expression "n/a" in Table 3 indicates that the property was not evaluated.

TABLE 3

Properties of Seed Used in Fluidizer to Produce Sample Nos. 1, 2 and 3

|  | Seed No. 1 | Seed No. 2 | Seed No. 3 |
| --- | --- | --- | --- |
| % Moisture | n/a | 3.90 | 3.90 |
| LOI before ICP | n/a | 1.73 | 1.73 |
| Screen Size | 28/40 | 32/40 | 32/40 |
| Size equivalent in microns | less than 716, larger than 381 | less than 630, larger than 381 | less than 630, larger than 381 |
| ICP Chemistry (wt. %) |  |  |  |
| $Fe_2O_3$ | n/a | 6.35 | 6.35 |
| CaO | n/a | 0.032 | 0.032 |
| MgO | n/a | 0.074 | 0.074 |
| $TiO_2$ | n/a | 3.29 | 3.29 |
| $K_2O$ | n/a | 0.001 | 0.001 |
| $SiO_2$ | n/a | 12.10 | 12.10 |
| $Al_2O_3$ | n/a | 77.77 | 77.77 |
| $ZrO_2$ | n/a | 0.17 | 0.17 |
| $P_2O_5$ | n/a | 0.067 | 0.067 |
| $Na_2O$ | n/a | 0.038 | 0.038 |

The raw material from which the external seeds were prepared (referred to as the "seed raw material") was a blend of calcined bauxite and calcined kaolin, which resulted in the blends producing a seed having the ICP chemistry as reported in Table 3. Based on the ICP chemistry, the blend was likely about 90% by weight bauxite and 10% by weight kaolin.

The seeds were generally prepared according to a process as described in U.S. Pat. No. 4,879,181 to Fitzgibbon et al., the entire disclosure of which is incorporated herein by reference. Thus, the seeds were made with a high intensity mixer having a horizontal or inclined circular table that can rotate at a speed of from about 10 to about 60 revolutions per minute (rpm), and a rotatable impacting impeller that can rotate in a direction opposite that of the table, and at a tip speed of from about 5 to about 50 meters per second. If the table is inclined, it can be inclined between 0 and 35 degrees from horizontal. In this Example 1, the seeds were prepared in an Eirich mixer available from Eirich Machines, Inc. The table was rotated at from about 20 to about 40 rpm, at an incline of about 30 degrees from horizontal.

The seed raw material was continuously fed to a ball mill, along with a feed of starch and bentonite, which was added to the ball mill at a rate to maintain a percentage based on the weight of the seed raw material in the mixer of about 0.50% and 0.70%, respectively. The starch was added as a binder. Bentonite, which is often used when working with calcined raw materials, was added as both a binder and plasticizer. In other embodiments, neither bentonite nor other binder is used. In still other embodiments, any suitable binder can be added in an amount of from about 0.25% to about 1.0% by weight of the seed raw material, or any other amount so as to assist formation of the seeds. Whether to use a binder at all, or to use more or less binder than the values reported herein can be determined by one of ordinary skill in the art through routine experimentation. Suitable binders include but are not limited to a corn starch, polyvinyl alcohol or sodium silicate solution, or a blend thereof. Liquid binders can be added to the mixer instead of being milled in the ball mill with the raw material. Various resins or waxes known and available to those of ordinary skill in the art may also be used as a binder.

The seed raw material (with the starch and bentonite mixed therein) was fed periodically to the Eirich mixer with continuous stirring. While the seed raw material was being stirred, water was continuously added to the mixer in an amount sufficient to cause formation of substantially round and spherical seeds. In this particular example, the water was fresh water, which was continuously fed to the mixer in an amount sufficient to maintain a percentage based on the weight of the seed raw material in the mixer from about 18 to about 22 weight %, although any amount that causes substantially round and spherical seeds to form upon mixing is sufficient. Those of ordinary skill in the art will understand how to determine a suitable amount of water to add to the mixer so that substantially round and spherical seeds are formed.

Once substantially round and spherical seeds of approximately a target size are formed, after about 2 to about 6 minutes of mixing, dry raw material dust was added to the mixer in an amount of about 10 weight percent of the seed raw material fed to the mixer. Concurrent with the addition of dry raw material, the speed of the mixer is reduced by one half. Mixing continues for up to about one minute, and then the mixer is stopped and the seeds are discharged. In the present example, the target size for each seed included that reported in Table 3, which are reported in a screen size and micron equivalency. The seeds produced in the Eirich were screened to the reported size for use as external seeds in the particle bed used in this Example 1.

The amount of mixing time can vary depending upon a number of factors, including but not limited to the amount of material in the mixer, speed of operation of the mixer, the amount of water fed to the mixer, and the desired seed size. Those of ordinary skill in the art can determine whether the mixing time should be greater than or less than the times described in this Example 1 such that substantially round and spherical seeds of approximately the desired size are formed. Other high intensity mixers suitable for making seeds of the type and size described herein, or for making other type and size of seeds, can be employed. Such alternative operating conditions and mixers can be determined by one of ordinary skill in the art through the exercise of routine experimentation.

The seeds formed in the mixer were dried for about 15 to about 60 minutes at a temperature ranging from about 100° C. (212° F.) to about 300° C. (572° F.). The dried seeds were used as external seeds to populate the particle bed of the trial fluidizer.

The slurry was fed through the trial fluidizer for a period of about 1.5 to about 2 hours. The heat exchanger heated the slurry so that the slurry was fed to the pressure nozzle of the fluidizer at an average temperature (over the 2 hour period) as reported below in Table 4. The pressure under which the slurry was pumped, the temperatures of the hot air incoming to and exhausting from the fluidizer, and other conditions of the fluidizer are also reported in Table 4.

TABLE 4

Average Fluidizer Conditions to Produce Samples Nos. 1, 2 and 3

| Slurry No. | Slurry Feed Pressure (psi) | Slurry Feed Temp | Hot Air Inlet Temp | Hot Air Exhaust Temp | Bed Temp | Perforated Plate ΔP |
|---|---|---|---|---|---|---|
| 1 | 447 | 155° F. 68° C. | 284° F. 140° C. | 160° F. 71° C. | 149° F. 65° C. | 4.6 |
| 2 | 444 | 123° F. 50° C. | 277° F. 136° C. | 131° F. 55° C. | 120° F. 49° C. | 3.0 |
| 3 | 446 | 113° F. 45° C. | 258° F. 126° C. | 120° F. 49° C. | 116° F. 47° C. | 3.5 |

The velocity of the hot air passing through the particle bed was controlled based on a visual observation of the particles in the fluidizer, so as to allow the particles to remain in the particle bed, and not be entrained in the air stream. The depth of the particle bed in each run was about 4-6 inches. The distance from the atomizing nozzles to the particle bed was about 10-12 inches.

When the particles in the fluidizer became substantially round and spherical, and approximately the target size, the air flow and the slurry feed to the fluidizer was stopped and the particles were removed and placed in storage containers.

A sample of the particles formed in the fluidizer was taken in order to conduct ICP chemical analysis, which was conducted according to methods known to those of ordinary skill in the art, which are generally described above. The results of the ICP analysis are reported below in Table 5 where "Sample No." indicates particles made from the correspondingly numbered Slurry and Seed, and "n/a" indicates that the property was not evaluated. The percent of alumina in the particles formed in the fluidizer is the sum of: a) the product of the ratio of coating in the particle multiplied by the alumina content of the slurry providing the coating; and b) the product of the ratio of the seed in the particle multiplied by the alumina content of the seed. By knowing the alumina contents of the seed, the slurry used to coat the seed, and the particle, the ratio of the coating to the seed can be determined for Sample Nos. 2 and 3.

TABLE 5

Properties of Particles Formed in Fluidizer

| | Sample No. 1 | Sample No. 2 | Sample No. 3 |
|---|---|---|---|
| % Moisture | 0.33 | 0.50 | 5.94 |
| LOI before ICP | 23.08 | 22.50 | 20.08 |
| ICP Chemistry (wt. %) | | | |
| $Fe_2O_3$ | 5.69 | 5.74 | 7.35 |
| CaO | 0.021 | 0.030 | 0.029 |
| MgO | 0.061 | 0.052 | 0.066 |
| $TiO_2$ | 3.53 | 3.58 | 3.28 |
| $K_2O$ | 0.001 | 0.001 | 0.002 |
| $SiO_2$ | 22.30 | 20.34 | 25.02 |
| $Al_2O_3$ | 68.12 | 69.81 | 63.85 |
| $ZrO_2$ | 0.09 | 0.09 | 0.08 |
| $P_2O_5$ | 0.056 | 0.059 | 0.049 |
| $Na_2O$ | 0.092 | 0.092 | 0.092 |
| % Coating | n/a | 82.0 | 86.7 |

Portions of each of the particles from the fluidizer (Sample Nos. 1, 2 and 3), were sintered in a static box kiln operating at a heating rate of about 960° C./hr and providing a hold time of about 30 minutes at the peak sintering temperature as reported below in Table 6.

The sintered particles were screened to a U.S. Mesh size as reported in Table 6, which indicates that 90% of the particles fell between 20 and 30 U.S. mesh. Thus, the size of the particles would be labeled as 20/40 according to API Recommended Practices RP60, Second Edition, December 1995, for testing proppants. Also as reported in Table 6, bulk density (BD), apparent specific gravity (ASG), specific gravity (SG), crush and short-term conductivity evaluations were conducted on samples of the screened sintered particles. Bulk density, ASG, SG, crush and short term conductivity of a commercially available sample of CARBOProp® proppant produced by CARBO Ceramics, Inc., New Iberia, La., which was screened to a U.S. Mesh size corresponding to that reported in Table 6, were also evaluated. The results of these evaluations are also reported below in Table 6, where "Sample No." indicates screened sintered particles made from the correspondingly numbered Slurry and Seed.

TABLE 6

Properties of Sintered Particles

| | Sample No. 1 | Sample No. 2 | Sample No. 3 | CARBOProp ® |
|---|---|---|---|---|
| Peak Sintering Temp (° C.) | 1520 | 1507 | 1497 | — |
| Screened to Size (U.S. Mesh) | | | | |
| 18 | 0.0 | 0.0 | 0.0 | 0.0 |
| 20 | 5.0 | 5.0 | 5.0 | 5.0 |
| 25 | 52.0 | 52.0 | 52.0 | 52.0 |
| 30 | 40.0 | 40.0 | 40.0 | 40.0 |
| 35 | 3.0 | 3.0 | 3.0 | 3.0 |
| 40 | 0.0 | 0.0 | 0.0 | 0.0 |
| Pan | 0.0 | 0.0 | 0.0 | 0.0 |
| Sample Properties | | | | |
| BD (g/cm³) | 1.69 | 1.73 | 1.73 | 1.83 |
| ASG | 3.10 | 3.16 | 3.12 | 3.41 |
| SG (g/cm³) | 3.09 | 3.10 | 3.09 | 3.26 |
| Crush at 10K psi | 4.4 | 6.3 | 5.5 | 4.8 |
| Conductivity (mD-ft) at | | | | |
| 2000 psi | 12850 | 10240 | 9900 | 10390 |
| 4000 psi | 10610 | 8490 | 8260 | 8440 |
| 6000 psi | 8400 | 6700 | 6190 | 6650 |
| 8000 psi | 5830 | 5170 | 4650 | 5060 |
| 10000 psi | 3670 | 3650 | 3200 | 3600 |
| 12000 psi | 2420 | 2430 | 2040 | 2980 |

The term "bulk density", as used herein, is defined to mean the weight per unit volume, including in the volume considered, the void spaces between the particles.

The term "apparent specific gravity," (ASG) as used herein, is a number without units, but is defined to be numerically equal to the weight in grams per cubic centimeter of volume, including void space or open porosity in determining the volume.

The ASG and crush strength were determined using API Recommended Practices RP60, Second Edition, December 1995, for testing proppants. This text is known and available to those of ordinary skill in the art. The crush strength is that percentage of the sample that was reduced to fines at the reported pressure, which is 10,000 psi as reported in Table 6. For the samples reported in Table 6, fines are particles having a size of less than 40 U.S. mesh.

The BD was determined by following ANSI Test method B74.4-1992 (R2002). This text is known and available to those of ordinary skill in the art.

The specific gravity was determined using a helium gas pycnometer (Micromeretics AccuPyc 1330) operated according to the procedures of the manufacturer. In contrast to ASG, the specific gravity excludes void space or open porosity in determining the volume.

Short term conductivity was determined according to API Recommended Practices RP-61, Second Edition, December 1995, as modified by various improvements adopted by the industry, which improvements are described in SPE papers 15067, 16453, and 16900. These texts are known and readily available to those of ordinary skill in the art.

The properties reported in Table 6 demonstrate that substantially round and spherical particles prepared from a slurry of an alumina-containing raw material and a mullite growth promoter according to the methods described herein have sufficient bulk densities, specific gravities, crush strengths and short term conductivities for use in propping a fracture in a formation. In particular, Sample No. 1 has a better crush strength and short term conductivity, while having a lower density, as compared to that of the CARBOProp® proppant sample. Sample Nos. 2 and 3 have comparable crush strengths and short term conductivities as compared to that of the CARBOProp® proppant sample, and also have a lower density as compared to the CARBOProp® proppant. The unique properties of Sample Nos. 1-3 are likely caused at least in part by an increased mullite content caused by the mullite growth promoter.

When used as a proppant, the particles described herein may be handled in the same manner as conventional proppants. For example, the particles may be delivered to the well site in bags or in bulk form along with the other materials used in fracturing treatment. Conventional equipment and techniques may be used to place the particles in the formation as a proppant. For example, the particles are mixed with a fracture fluid, which is then injected into a fracture in the formation.

In an exemplary method of fracturing a subterranean formation, a hydraulic fluid is injected into the formation at a rate and pressure sufficient to open a fracture therein, and a fluid containing substantially round and spherical sintered particles prepared from a slurry as described herein and having one or more of the properties as described herein is injected into the fracture to prop the fracture in an open condition.

Particles appropriately sized for use as a foundry media, typically smaller than that used for proppant, can also be produced according to the methods described herein. Particles produced according to the methods described herein are ceramic media, and therefore have a higher permeability than natural sands currently used in the foundry industry. Thus, the particles produced according to the methods described herein can be expected to vent foundry gases better than sand, thereby reducing gas defects in molds and castings. In addition, ceramic media has a lower thermal expansion than natural quartz silica sand, which also reduces defects. In particular, particles produced according to methods described herein are expected to have a thermal expansion property even lower than that of conventional ceramic media because of the enhanced mullite content (and consequently decreased crystalline silica content).

The foregoing description and embodiments are intended to illustrate the invention without limiting it thereby. It will be understood that various modifications can be made in the invention without departing from the spirit or scope thereof.

What is claimed is:

1. A method for producing sintered particles comprising:
   preparing a slurry having a solids content of from about 40 to about 60% by weight, and comprising water, a binder, a mullite growth promoter and a raw material having an alumina content in a range of from about 55 to about 80% by weight;
   atomizing the slurry into droplets;
   coating seeds comprising alumina with the droplets to form green particles; and
   sintering at least a portion of the green particles at a temperature of from about 1000° C. to about 1600° C. for about 5 minutes to about 90 minutes, to form sintered particles having an alumina content of greater than about 55% by weight, an iron oxide content in a range of from about 2 to about 10% by weight, a specific gravity in a range of from about 2.70 g/cm³ to about 3.50 g/cm³, and a bulk density in a range of from about 1.55 g/cm³ to about 1.95 g/cm³.

2. The method of claim 1 wherein the mullite growth promoter comprises iron oxide present in the raw material in a range of from about 2 to about 10% by weight.

3. The method of claim 1 wherein the mullite growth promoter and raw material comprise the total solids in the slurry, and the mullite growth promoter comprises iron oxide added to the raw material in a range of from about 2 to about 10% by weight of the total solids in the slurry.

4. The method of claim 1 wherein the bulk density is from about 1.65 g/cm$^3$ to about 1.80 g/cm$^3$.

5. The method of claim 1 further comprising adding to the slurry at least one of a pH-adjusting reagent, a dispersant and a defoamer before atomizing the slurry.

6. The method of claim 1 wherein atomizing the slurry comprises feeding the slurry to a fluidizer operable to atomize the slurry into droplets; and wherein the seeds are positioned in a particle bed in the fluidizer.

7. The method of claim 1 wherein the raw material comprises at least one of calcined kaolin, calcined bauxite, uncalcined kaolin and uncalcined bauxite.

8. The method of claim 1 further comprising drying the green particles before sintering.

9. The method of claim 1 wherein the slurry has an alumina content and the seeds have an alumina content, wherein the slurry alumina content is 10% less than the seed alumina content.

10. The method of claim 1 wherein the slurry has an alumina content and the seeds have an alumina content, wherein the slurry alumina content is 10% greater than the seed alumina content.

11. The method of claim 1 wherein the slurry has an alumina content from about 60 to about 70% by weight, and an iron oxide content from about 4 to about 10% by weight.

12. The method of claim 1 wherein the sintered particles have an alumina content from about 60 to about 70% by weight, and an iron oxide content from about 4 to about 10% by weight.

\* \* \* \* \*